United States Patent
Li et al.

(10) Patent No.: US 10,783,277 B2
(45) Date of Patent: Sep. 22, 2020

(54) BLOCKCHAIN-TYPE DATA STORAGE

(71) Applicant: Alibaba Group Holding Limited, George Town (KY)

(72) Inventors: Yize Li, Hangzhou (CN); Xinying Yang, Hangzhou (CN); Yuan Zhang, Hangzhou (CN); Benquan Yu, Hangzhou (CN); Wenyuan Yan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/806,875

(22) Filed: Mar. 2, 2020

(65) Prior Publication Data

US 2020/0202041 A1    Jun. 25, 2020

Related U.S. Application Data

(63) Continuation of application No. PCT/CN2020/071678, filed on Jan. 13, 2020.

(30) Foreign Application Priority Data

May 31, 2019 (CN) .......................... 2019 1 0473001

(51) Int. Cl.
*G06F 21/62* (2013.01)
*H04L 9/32* (2006.01)
(Continued)

(52) U.S. Cl.
CPC ...... *G06F 21/6272* (2013.01); *G06F 16/2255* (2019.01); *H04L 9/0637* (2013.01); *H04L 9/3247* (2013.01)

(58) Field of Classification Search
CPC ... H04L 63/062; H04L 9/0637; H04L 9/0643; H04L 9/0894; H04L 9/30; H04L 9/0618;
(Continued)

(56) References Cited

U.S. PATENT DOCUMENTS 7,962,765 B2  6/2011  Malcolm
2017/0041312 A1  2/2017  Luo
(Continued)

FOREIGN PATENT DOCUMENTS

CN  103685162  3/2014
CN  105975870  9/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Christopher C Harris
(74) *Attorney, Agent, or Firm* — Fish & Richardson P.C.

(57) ABSTRACT

This disclosure relates to blockchain-type data storage. In one aspect, a method includes receiving, by a database server, multiple second data records. Each second data record includes a first data record having a user identifier and a digital signature of the first data record. Hash values of the second data records are determined. In response to a blockchain-type block generation condition being satisfied, the database server determines two or more second data records to be written in a data block. An Nth data block that includes a hash value and a block height is generated. N is a sequence number of the Nth data block in a sequence of data blocks. When N>1, generating the Nth data block includes determining the hash value for the Nth data block based on the hash values of the two or more second data records and a hash value of a (N−1)th data block.

15 Claims, 4 Drawing Sheets

(51) Int. Cl.
*H04L 9/06* (2006.01)
*G06F 16/22* (2019.01)

(58) Field of Classification Search
CPC ............ H04L 2209/38; H04L 2209/56; H04L 9/3247; G06F 21/64; G06F 21/6272; G06F 16/2255
See application file for complete search history.

(56) References Cited

U.S. PATENT DOCUMENTS

| | | | |
|---|---|---|---|
| 2018/0302222 A1* | 10/2018 | Agrawal | H04W 12/00503 |
| 2019/0058696 A1* | 2/2019 | Bowman | H04L 9/3234 |
| 2019/0173872 A1* | 6/2019 | Arora | G06Q 20/3678 |
| 2019/0220324 A1* | 7/2019 | Carver | G06N 7/08 |
| 2019/0238316 A1* | 8/2019 | Padmanabhan | H04L 9/3297 |
| 2019/0295049 A1* | 9/2019 | Karame | H04L 9/30 |
| 2019/0386833 A1* | 12/2019 | Alger | H04L 9/3247 |
| 2020/0014537 A1* | 1/2020 | Ortiz | H04L 9/0866 |
| 2020/0028693 A1* | 1/2020 | Wu | H04L 9/3218 |
| 2020/0067907 A1* | 2/2020 | Avetisov | G06F 16/9014 |
| 2020/0117825 A1* | 4/2020 | Vaswani | G06F 21/64 |
| 2020/0127826 A1* | 4/2020 | Ebrahimi | G06F 21/46 |

FOREIGN PATENT DOCUMENTS

| | | |
|---|---|---|
| CN | 106022154 | 10/2016 |
| CN | 106997439 | 8/2017 |
| CN | 108055133 | 5/2018 |
| CN | 109635581 | 4/2019 |
| CN | 109768865 | 5/2019 |
| CN | 110245518 | 9/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071678, dated Apr. 13, 2020, 14 pages (with partial machine translation).

blog.csdn.net [online], "Blockchain-Data Blocks", May 6, 2019, retrieved on Jun. 29, 2020, retrieved from URL <https://blog.csdn.net/qq_40452317/article/details/89875394>, 6 pages (with machine translation).

* cited by examiner

BLOCKCHAIN-TYPE DATA STORAGE

CROSS-REFERENCE TO RELATED APPLICATIONS

This application is a continuation of PCT Application No. PCT/CN2020/071678, filed on Jan. 13, 2020, which claims priority to Chinese Patent Application No. 201910473001.0, filed on May 31, 2019, and each application is hereby incorporated by reference in its entirety.

TECHNICAL FIELD

Implementations of the present disclosure relate to the field of information technologies, and in particular, to data storage.

BACKGROUND

When data is stored in a centralized blockchain-type ledger that stores data based on a blockchain data structure (e.g., in a form of a blockchain), generally speaking, a database server is not directly accessible to users. Data of the users is generated based on an application server, and then the application server forwards the data of the users to the database server for storage. In this case, the users do not know whether their own data becomes wrong or is changed during storage.

SUMMARY

An objective of implementations of the present application is to provide methods for ensuring user data storage security.

To resolve the previous technical problem, the implementations of the present application are implemented as follows:

A data storage method is provided, where the method is applied to a system including an application server and a database server, and the method includes: obtaining, by the application server, first data records including user identifiers; obtaining, by the application server, corresponding user private keys based on the user identifiers, and executing predetermined data record signing codes in a trusted execution environment to generate second data records including user digital signatures, where the data record signing codes is used to digitally sign the first data records based on the user private keys; sending, by the application server, the second data records to the database server; receiving, by the database server, the second data records, and determining hash values of the second data records; and when a predetermined block generation condition is satisfied, determining, by the database server, second data records to be written in a data block, and generating the Nth data block including a hash value of the data block and the second data records, which specifically includes: when N=1, a hash value and a block height of an initial data block are given based on a predetermined way; or when N>1, a hash value of the Nth data block is determined based on the second data records to be written in the data block and a hash value of the (N−1)th data block, and the Nth data block including the hash value of the Nth data block and the second data records is generated, where a block height of the data block monotonically increases as more blocks are generated.

Correspondingly, an implementation of the present specification further provides a data storage system, where the system includes an application server and a database server, and in the system: the application server is configured to obtain first data records including user identifiers; obtain corresponding user private keys based on the user identifiers, and execute predetermined data record signing codes in a trusted execution environment to generate second data records including user digital signatures, where the data record signing codes is used to digitally sign the first data records based on the user private keys; and send the second data records to the database server; and the database server is configured to receive the second data records, and determine hash values of the second data records; and when a predetermined block generation condition is satisfied, determine second data records to be written in a data block, and generate the Nth data block including a hash value of the data block and the second data records, which specifically includes: when N=1, a hash value and a block height of an initial data block are given based on a predetermined way; or when N>1, a hash value of the Nth data block is determined based on the second data records to be written in the data block and a hash value of the (N−1)th data block, and the Nth data block including the hash value of the Nth data block and the second data records is generated, where a block height of the data block monotonically increases as more blocks are generated.

According to another aspect, an implementation of the present specification further provides a data storage method, where the method is applied to an application server, and the method includes: obtaining first data records including user identifiers; obtaining corresponding user private keys based on the user identifiers, and executing predetermined data record signing codes in a trusted execution environment to generate second data records including user digital signatures, where the data record signing codes is used to digitally sign the first data records based on the user private keys; and sending the second data records to a database server.

Correspondingly, an implementation of the present specification further provides a data storage apparatus, where the apparatus is applied to an application server, and the apparatus includes: a receiving module, configured to obtain first data records including user identifiers; a generation module, configured to obtain corresponding user private keys based on the user identifiers, and execute predetermined data record signing codes in a trusted execution environment to generate second data records including user digital signatures, where the data record signing codes is used to digitally sign the first data records based on the user private keys; and a sending module, configured to send the second data records to a database server.

According to the solutions provided in the implementations of the present specification, the application server digitally signs data of users in the trusted execution environment to generate the second data records including the user digital signatures, and stores the second data records in a centralized blockchain-type ledger, to implement tamper-resistance of the data including the user digital signatures, and ensure user data storage security, thereby improving user experience.

It is worthwhile to understand that the previous general description and the following detailed description are merely examples and explanation, and cannot limit the implementations of the present specification.

In addition, any of the implementations of the present specification does not need to achieve all the previous effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations recorded in the implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following describes the technical solutions in the implementations of the present specification in detail with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope.

Figure 1:
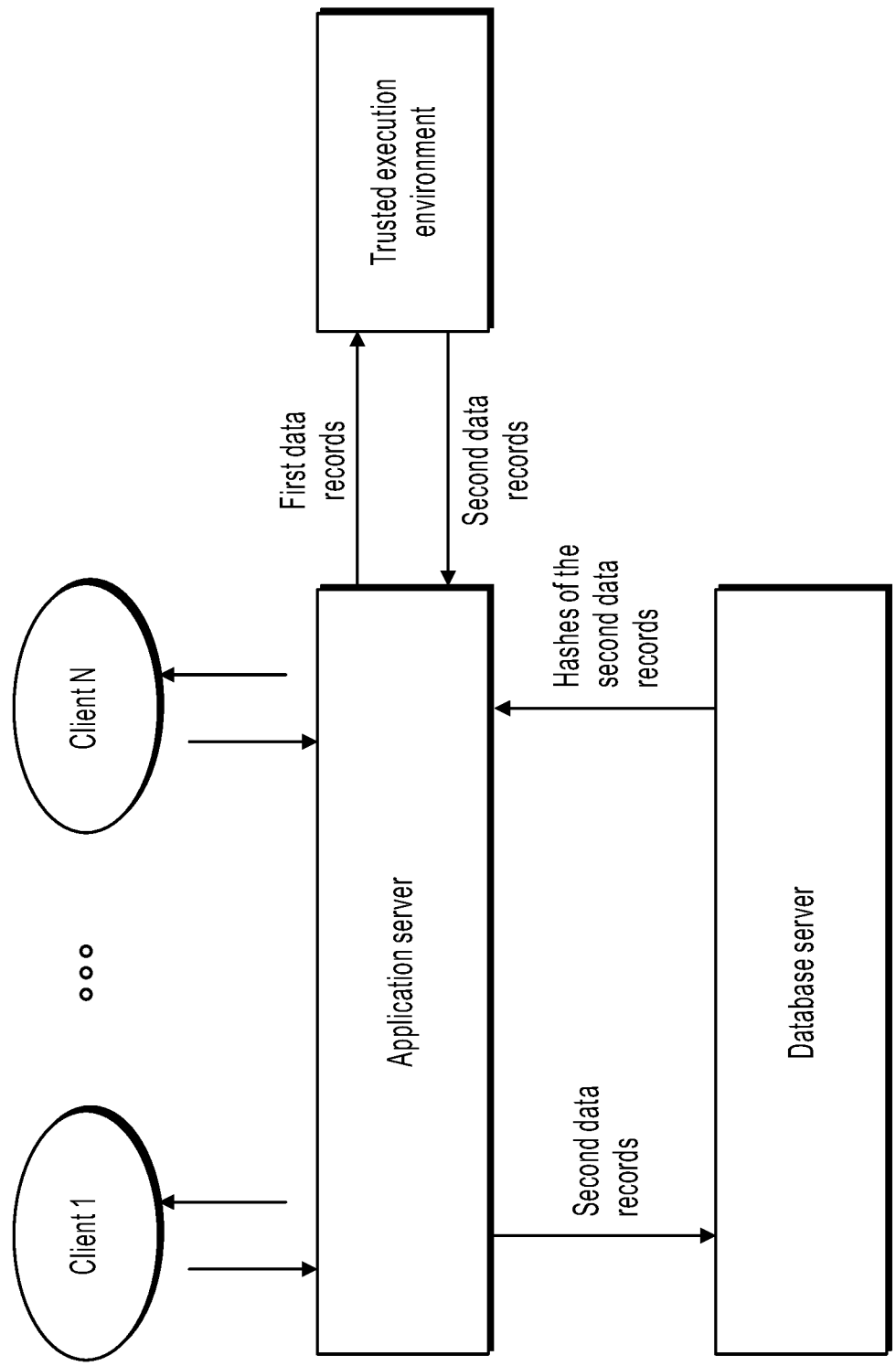
FIG. 1 is a schematic diagram illustrating a system architecture, according to an implementation of the present specification.

In a current server architecture, a database server can be directly interconnected to client personal users. Alternatively, some application servers can be interconnected to client personal users, and the database server is interconnected to the application servers. FIG. 1 is a schematic diagram illustrating a system architecture, according to an implementation of the present specification.

Figure 2:
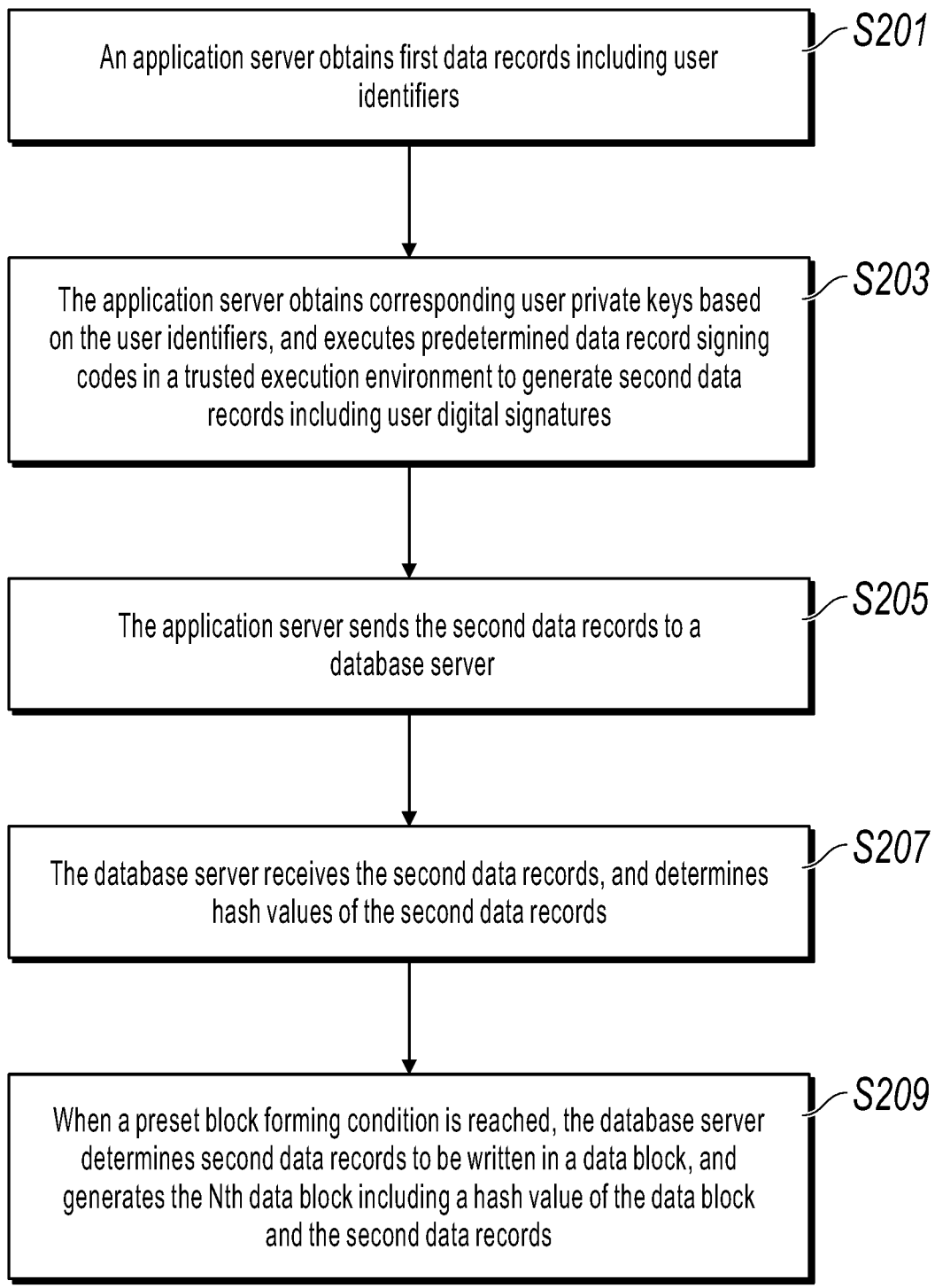
FIG. 2 is a schematic flowchart illustrating a data storage method in terms of a system, according to an implementation of the present specification.

The technical solutions provided in the implementations of the present specification are described in detail below with reference to the accompanying drawings. FIG. 2 is a schematic flowchart illustrating a data storage method in terms of a system, according to an implementation of the present specification. The method is applied to a system including an application server and a database server, and the process specifically includes the following steps.

S201. The application server obtains first data records including user identifiers.

The first data records can be original data sent by clients, for example, operation commands, transaction orders, etc. sent by the clients; or can be data generated by the application server based on operations of the clients, for example, operation logs.

The application server can obtain the user identifiers corresponding to the clients in this case, and bind the user identifiers to the first data records, for example, write the user identifiers in specified locations of the first data records, or splice the user identifiers with headers of the first data records, to obtain the first data records including the user identifiers.

S203. The application server obtains corresponding user private keys based on the user identifiers, and executes predetermined data record signing codes in a trusted execution environment to generate second data records including user digital signatures.

It is worthwhile to note that in this implementation of the present specification, the application server usually centrally provides a service. Each user can store a private key of the user in the application server and establish a corresponding mapping relationship between the private key and a user identifier, and can verify an encryption result of the application server at any time by using a public key of the user, so that it can be ensured that the application server uses the private key of the user in an encryption process.

In addition, in the encryption process, the application server performs a segment of code that can be public, so that both the public and the user can understand a use of the code, thereby ensuring fairness of encrypted data obtained in this implementation of the present specification.

In this implementation of the present specification, the code is a segment of data record signing codes, used to digitally sign the first data records based on the user private keys. A method for performing digital signature by using a private key is very common, and details are omitted here for simplicity. It is worthwhile to note that in this process, the invoked user private key is not public.

Therefore, the application server can perform private key signature in a TEE (trusted execution environment) to ensure fairness. The TEE can function as a black box in hardware. Neither code executed in the TEE nor a data operating system layer can be peeped, and only an interface predefined in the code can operate the code.

The TEE is a secure extension based on CPU hardware and is isolated from the outside. The TEE was first proposed by the Global Platform to resolve secure resource isolation on a mobile device, and is parallel to an operating system to provide a trusted and secure execution environment for an application program. The TrustZone™ technology of ARM™ first implements commercial TEE technology.

With the rapid development of the Internet, security demands are increasingly high, and many entities not limited to mobile devices, cloud devices, and data centers put more demands on the TEE. The concept of the TEE has also been developed and expanded at a high speed. The TEE mentioned at present is a more general TEE than the originally proposed concept. For example, server chip manufacturers such as Intel™ and AMD™ successively introduce a hardware-assisted TEE and enrich the concept and features of the TEE, which is widely recognized in the industry. The TEE mentioned at present generally refers to this type of hardware-assisted TEE technology. Unlike a mobile end, remote access is needed for cloud access, and a hardware platform is not visible to end users. Therefore, the first step of using the TEE is to determine that the TEE is authentic and trusted. Therefore, a remote attestation mechanism is introduced in current TEE technologies, a hardware manufacturer (mainly a CPU manufacturer) performs endorsement, and a digital signature technology is used to ensure that a user can verify a TEE status. In other words, a result of execution in the TEE can be digitally signed by the hardware manufacturer.

In addition, merely secure resource isolation cannot meet the security demands, and further data privacy protection is also proposed. A memory encryption technology is also provided in commercial TEEs including Intel SGX and AMD SEV, to limit trusted hardware inside a CPU, and both bus and memory data are ciphertexts to prevent the data from being peeped by a malicious user. For example, TEE technologies such as Intel Software Guard Extensions (SGX) isolate code execution, remote attestation, secure configuration, secure data storage, and trusted paths for executing code. Security of an application program running in the TEE is protected and the application program is almost impossible to be accessed by a third party.

The Intel SGX technology is used as an example. SGX provides an enclave, that is, an encrypted trusted execution area in a memory, and in the enclave, a CPU protects data from being stolen. For example, a server uses a CPU that supports SGX. Based on an added processor instruction, an enclave page cache can be allocated in a memory, and data in the EPC is encrypted by using a memory encryption engine (MEE) in the CPU. Encrypted content in the EPC is decrypted into a cleartext only after entering the CPU. Therefore, in SGX, a user can distrust an operating system, a virtual machine monitor (VMM), or even a basic input output system (BIOS), and code execution can be ensured provided that the user trusts the CPU.

In this implementation of the present specification, the public code is executed in the TEE to perform user private key encryption, so that the second data records including the user digital signatures can be obtained. Authenticity of the second data records is ensured by a hardware provider of the TEE.

S205. The application server sends the second data records to the database server.

S207. The database server receives the second data records, and determines hash values of the second data records.

S209. When a predetermined block generation condition is satisfied, the database server determines second data records to be written in a data block, and generates the Nth data block including a hash value of the data block and the second data records.

The predetermined block generation condition includes: a quantity of second data records to be stored reaches a quantity threshold. For example, a new data block is generated each time one thousand second data records are received, and the one thousand second data records are written in the block. Alternatively, the predetermined block generation condition includes: a time interval from the last block generation time reaches a time threshold. For example, a new data block is generated every five minutes, and second data records received in the five minutes are written in the block.

N here is a sequence number of the data block. In other words, in this implementation of the present specification, data blocks are arranged in a blockchain form as more blocks are generated, and have a strong time sequence feature. A block height of the data block monotonously increases as more blocks are generated. The block height can be a sequence number, and in this case, a block height of the Nth data block is N. Alternatively, the block height can be generated in other ways.

When N=1, the data block in this case is an initial data block. A hash value and a block height of the initial data block are given based on a predetermined way. For example, if the initial data block includes no second data record, the hash value is any given hash value, and the block height blknum=0. For another example, a trigger condition for generating the initial data block is consistent with a trigger condition for generating another data block, but the hash value of the initial data block is determined by performing hashing on all content in the initial data block.

When N>1, because content and a hash value of a previous data block have been determined, in this case, a hash value of the current data block (the Nth data block) can be generated based on the hash value of the previous data block (that is, the (N−1)th data block). For example, in a feasible way, a hash value of each second data record to be written in the Nth data block is determined, a Merkel tree is generated based on a sequence of the second data records in the block, a root hash value of the Merkel tree is spliced with the hash value of the previous data block, and the hash value of the current data block is generated by using a hash algorithm again. Alternatively, the hash value of the current data block can be generated based on the root hash value of the Merkel tree and some other metadata (such as a version number and a data block generation timestamp). For another example, splicing and hashing can be performed based on a sequence of the second data records in the block to obtain an overall hash value of the second data records, the hash value of the previous data block can be spliced with the overall hash value of the second data records, and a hash operation is performed on a string obtained after the splicing to generate the hash value of the data block.

According to the previously described data block generation method, each data block is determined by using a hash value, and the hash value of the data block is determined based on content and a sequence of second data records in the data block and a hash value of a previous data block. A user can initiate verification at any time based on a hash value of a data block or hash values of second data records. Modification to any content in the data block (including modification to content or a sequence of the second data records in the data block) results in inconsistency between a hash value of the data block obtained through calculation during verification and a hash value of the data block during data block generation, causing a verification failure. Therefore, tamper-resistance under centralization is implemented.

In this implementation of the present specification, a format of the data block can be customized. In an implementation, the format of the data block can be similar to a block format in a blockchain. Each data block includes a block header for storing metadata and a block body for storing second data records. The block header in the data block can be used to store a parent hash, a block hash value of the data block, a version number, a root hash of a Merkel tree of the data records, a timestamp, etc.

According to the solutions provided in this implementation of the present specification, the application server digitally signs data of users in the trusted execution environment to generate the second data records including the user digital signatures, and stores the second data records in a centralized blockchain-type ledger. The digital signature ensures that the data is certainly generated by the users, and the centralized blockchain-type ledger storage implements tamper-resistance of the data including the user digital signatures. Therefore, according to the solutions, user data storage security is ensured, thereby improving user experience.

In an implementation, the database server can verify the second data records before storing the second data records. That is, the database server can determine corresponding public keys based on the user identifiers. In a digital signature process, the corresponding public keys are public, and any user or institution can know a public key corresponding to a user. Therefore, the corresponding public keys can be obtained based on the user identifiers, and the second data records can be verified.

If the verification succeeds, the data records are written in the data block. Otherwise, the data records are not written in the data block, and a corresponding notification message can be further returned to the application server. A specific digital signature verification method is also common at present, and details are omitted here for simplicity.

In an implementation, the database server can further return the hash values of the second data records to the application server; and the application server can forward the hash values of the second data records to first clients corresponding to the user identifiers. Therefore, the first clients can obtain the corresponding second data records through querying based on the hash values at any time, and can verify accuracy of the private keys in the second data records. Alternatively, the first clients can perform integrity verification on the ledger storing the second data records based on the hash values at any time. A specific integrity verification method has previously described in detail.

In an implementation, multiple different clients may need to share data between each other. For example, on a shared learning platform, different clients can separately enter their own data to the same learning platform (that is, the application server) as training samples, and the learning platform can perform model training on the data of the clients.

In addition, any client can perform corresponding operations (for example, updating and retraining) on a training model obtained by the platform, and a client may further need to perform model training related to the client based on data of another client. In this case, a client has a motivation for querying and verifying data provided by another client, data generated during use of another client, etc.

In this case, the first clients or the application server can disclose the hash values of the second data records generated based on operations of the first clients, and other clients can send the hash values to the application server for corresponding query.

Then, the application server can receive query requests that include the hash values of the second data records and that are sent by second clients, and forward the query request to the database server; the database server can obtain the corresponding second data records through querying based on the hash values of the second data records, and return the data records to the application server; and the application server can forward the second data records obtained through querying to the second clients, so that the second clients decrypt and verify the second data records by using public keys of the first clients.

In this method, in such a case in which multiple clients share data, any client can perform validity verification on data generated by another client, and determine that data provided or generated by any other user is reliable and valid, to achieve joint public surveillance, thereby further ensuring user data storage security and improving user experience.

Correspondingly, an implementation of the present specification further provides a data storage system, where the system includes an application server and a database server, and in the system: the application server is configured to obtain first data records including user identifiers; obtain corresponding user private keys based on the user identifiers, and execute predetermined data record signing codes in a trusted execution environment to generate second data records including user digital signatures, where the data record signing codes is used to digitally sign the first data records based on the user private keys; and send the second data records to the database server; and the database server is configured to receive the second data records, and determine hash values of the second data records; and when a predetermined block generation condition is satisfied, determine second data records to be written in a data block, and generate the Nth data block including a hash value of the data block and the second data records, which specifically includes: when N=1, a hash value and a block height of an initial data block are given based on a predetermined way; or when N>1, a hash value of the Nth data block is determined based on the second data records to be written in the data block and a hash value of the (N−1)th data block, and the Nth data block including the hash value of the Nth data block and the second data records is generated, where a block height of the data block monotonically increases as more blocks are generated.

Further, in the system, the database server is further configured to determine corresponding user public keys based on user identifiers, and verify the second data records by using the user public keys.

Further, in the system, the predetermined block generation condition in the database server includes: a quantity of data records to be stored reaches a quantity threshold; or a time interval from the last block generation time reaches a time threshold.

Further, in the system, the database server is configured to return the hash values of the second data records to the application server; and the application server is configured to forward the hash values of the second data records to first clients.

Further, in the system, the application server is further configured to receive query requests that include the hash values of the second data records and that are sent by second clients, and forward the query request to the database server; correspondingly, the database server is further configured to obtain the corresponding second data records through querying based on the hash values of the second data records, and return the data records to the application server; and the application server is configured to forward the second data records obtained through querying to the second clients, so that the second clients decrypt and verify the second data records by using public keys of the first clients.

Further, in the system, the trusted execution environment includes Intel SGX, AMD SEV, or ARM TrustZone™.

Figure 3:
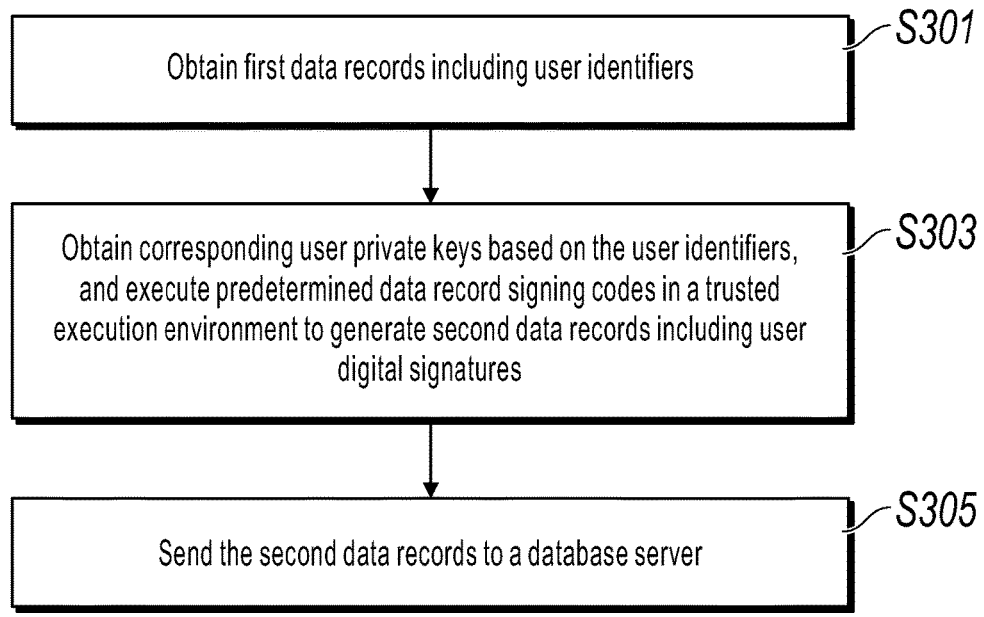
FIG. 3 is a schematic flowchart illustrating a data storage method in terms of an application server, according to an implementation of the present specification.

According to another aspect, an implementation of the present specification further provides a data storage method. The method is applied to an application server. FIG. 3 is a schematic flowchart illustrating a data storage method in terms of an application server, according to an implementation of the present specification. The method includes the following steps:

S301. Obtain first data records including user identifiers.

S303. Obtain corresponding user private keys based on the user identifiers, and execute predetermined data record signing codes in a trusted execution environment to generate second data records including user digital signatures, where the data record signing codes is used to digitally sign the first data records based on the user private keys.

S305. Send the second data records to a database server.

Figure 4:
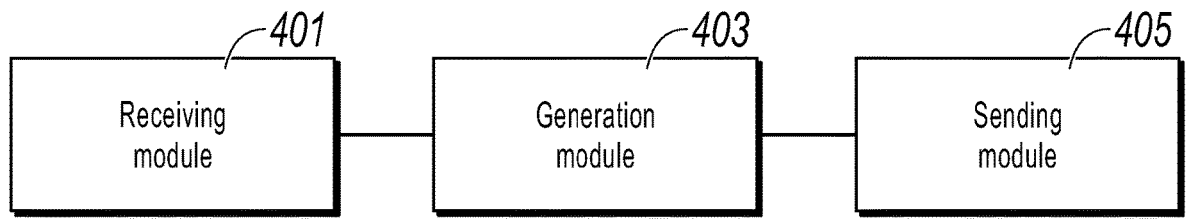
FIG. 4 is a schematic structural diagram illustrating a data storage apparatus, according to an implementation of the present specification.

Correspondingly, an implementation of the present specification further provides a data storage apparatus. The apparatus is applied to an application server. FIG. 4 is a schematic structural diagram illustrating a data storage apparatus, according to an implementation of the present specification. The apparatus includes: receiving module 401, configured to obtain first data records including user identifiers; generation module 403, configured to obtain corresponding user private keys based on the user identifiers, and execute predetermined data record signing codes in a trusted execution environment to generate second data records including user digital signatures, where the data record signing codes is used to digitally sign the first data records based on the user private keys; and sending module 405, configured to send the second data records to a database server.

An implementation of the present specification further provides a computer device. The computer device includes at least a memory, a processor, and a computer program that is stored in the memory and that can run on the processor. The processor performs the data storage method shown in FIG. 3 when executing the program.

Figure 5:
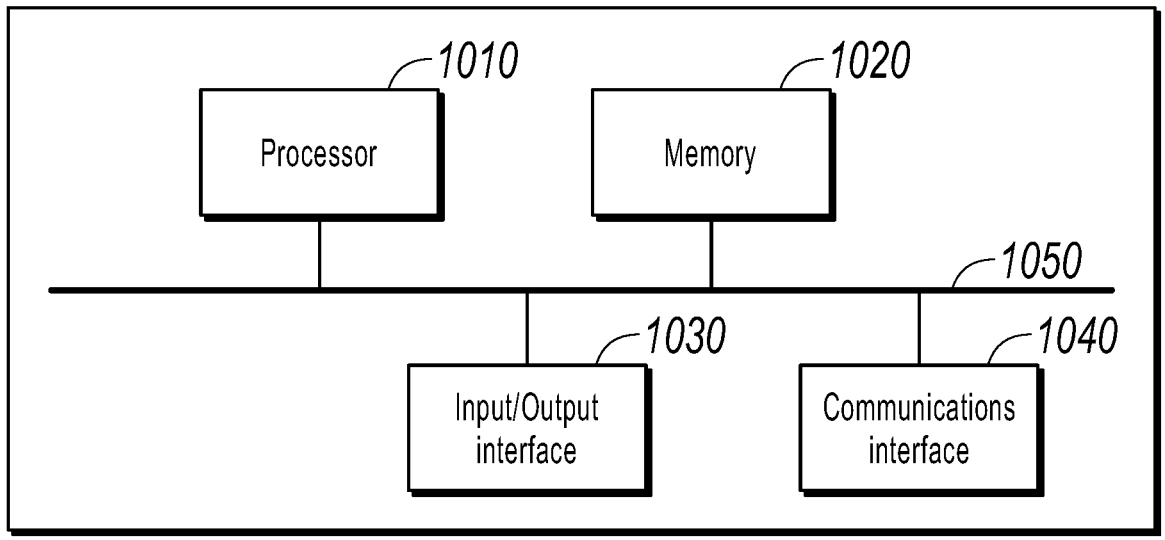
FIG. 5 is a schematic structural diagram illustrating a device for configuring the method in the implementations of the present specification.

FIG. 5 is a more detailed schematic diagram illustrating a hardware structure of a computing device, according to an implementation of the present specification. The device can include processor 1010, memory 1020, input/output interface 1030, communications interface 1040, and bus 1050. Processor 1010, memory 1020, input/output interface 1030, and communications interface 1040 are communicatively connected to each other inside the device by using bus 1050.

Processor 1010 can be implemented by using a general central processing unit (CPU), a microprocessor, an application-specific integrated circuit (ASIC), one or more integrated circuits, etc. Processor 1010 is configured to execute a related program, to implement the technical solutions provided in the implementations of the present specification.

Memory 1020 can be implemented by using a read-only memory (ROM), a random access memory (RAM), a static storage device, a dynamic storage device, etc. Memory 1020 can store an operating system and another application program. When the technical solutions provided in the implementations of the present specification are implemented by using software or firmware, related program code is stored in memory 1020 and is invoked and executed by processor 1010.

Input/output interface 1030 is configured to be connected to an input/output module, to input or output information. The input/output module (not shown in the figure) can be configured in the device a component, or can be externally connected to the device to provide a corresponding function. The input module can be a keyboard, a mouse, a touchscreen, a microphone, various sensors, etc. The output module can be a monitor, a speaker, an oscillator, an indicator, etc.

Communications interface 1040 is configured to be connected to a communications module (not shown in the figure), to implement communication interaction between the device and another device. The communications module can implement communication in a wired way (for example, by using a USB or a network cable), or can implement communication in a wireless way (for example, by using a mobile network, Wi-Fi, or Bluetooth).

Bus 1050 includes a channel for transmitting information between components (for example, processor 1010, memory 1020, input/output interface 1030, and communications interface 1040) of the device.

It is worthwhile to note that although only processor 1010, memory 1020, input/output interface 1030, communications interface 1040, and bus 1050 of the device are shown, in a specific implementation process, the device can further include other components needed for normal running. In addition, a person skilled in the art can understand that the device can include only components necessary for implementing the solutions in the implementations of the present specification, but does not necessarily include all the components shown in the figure.

An implementation of the present specification further provides a computer readable storage medium. The computer readable storage medium stores a computer program, and the data storage method shown in FIG. 3 is implemented when the program is executed by a processor.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage, or another magnetic storage device, or any other non-transmission medium. The computer storage medium can be configured to store information accessible to a computing device. As defined in the present specification, the computer readable medium does not include computer readable transitory media such as a modulated data signal and a carrier.

It can be understood from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

The implementations of the present specification are described in a progressive way. For same or similar parts of the implementations, mutual references can be made to the implementations. Each implementation focuses on a difference from other implementations. Particularly, a device implementation is basically similar to a method implementation, and therefore is described briefly. For a related part, references can be made to some descriptions in the method implementation. The previously described apparatus implementations are merely examples. The modules described as separate parts may or may not be physically separate. During implementation of the solutions in the implementations of the present specification, functions of the modules can be implemented in one or more pieces of software and/or hardware. Some or all of the modules can be selected based on actual demands to implement the objective of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make improvements or polishing without departing from the principle of the implementations of the present specification, and the improvements or polishing shall fall within the protection scope of the implementations of the present specification.

What is claimed is:

1. A computer-implemented method, the method comprising:
   receiving, by a database server and from an application server, a plurality of second data records, wherein each second data record comprises (i) a first data record comprising a user identifier and (ii) a user digital signature of the first data record generated by the application server in a trusted execution environment using a user private key corresponding to the user identifier of the first data record;
   determining, for each second data record of the second data records, a corresponding hash value;
   in response to a predetermined blockchain-type block generation condition being satisfied: determining, by the database server, two or more second data records of the plurality of second data records to be written in a data block; and
   generating an Nth data block comprising a hash value and a block height, wherein N is a sequence number of the Nth data block in a sequence of data blocks, and wherein
      when N=1, generating the Nth data block comprises determining the hash value for the Nth data block based on (i) the hash values of the two or more second data records or (ii) a default hash value, and
      assigning, as the block height of the Nth data block, an initial block height, and
      when N>1, generating the Nth data block comprises determining the hash value for the Nth data block based on the corresponding hash values of the two or more second data records and a hash value of a (N−1)th data block, wherein the block height of the Nth data block monotonically increases as more blocks are generated;
   storing the Nth data block in a blockchain-type ledger;
   returning, by the database server, the corresponding hash values of the plurality of second data records to the application server;
   receiving, by the database server and from the application server, query requests that comprise the corresponding hash values of the plurality of second data records; and
   for each query request:
      obtaining, by the database server, a particular second data record by querying, the blockchain-type ledger in which each Nth data block is stored, based on the corresponding hash value of the query request, and returning the particular second data record to the application server.

2. The computer-implemented method of claim 1, wherein before determining, by the database server, the two or more second data records to be written in a data block, the method comprises:
   determining user public keys corresponding to the user identifiers of the first data records; and
   verifying the plurality of second data records using the user public keys.

3. The computer-implemented method of claim 1, wherein the predetermined blockchain-type block generation condition comprises:
   a quantity of second data records to be stored reaches a quantity threshold;
   or a time interval from a last block generation time reaches a time threshold.

4. The computer-implemented method of claim 1, further comprising:
   forwarding, by the application server, the corresponding hash values of the second data records to first clients corresponding to the user identifiers of the first data records.

5. The computer-implemented method of claim 1, further comprising, for each query request:
   forwarding, by the application server, the particular second data record, obtained by the querying, to decryption and verification components of a second client from which the application server received the query request.

6. A non-transitory, computer-readable medium storing one or more instructions executable by a computer system to perform operations comprising:
   receiving, by a database server and from an application server, a plurality of second data records, wherein each second data record comprises (i) a first data record comprising a user identifier and (ii) a user digital signature of the first data record generated by the application server in a trusted execution environment using a user private key corresponding to the user identifier of the first data record;
   determining, for each second data record of the second data records, a corresponding hash value;
   in response to a predetermined blockchain-type block generation condition being satisfied: determining, by the database server, two or more second data records of the plurality of second data records to be written in a data block; and
   generating an Nth data block comprising a hash value and a block height, wherein N is a sequence number of the Nth data block in a sequence of data blocks, and wherein
      when N=1, generating the Nth data block comprises determining the hash value for the Nth data block based on (i) the hash values of the two or more second data records or (ii) a default hash value, and
      assigning, as the block height of the Nth data block, an initial block height, and
      when N>1, generating the Nth data block comprises determining the hash value for the Nth data block based on the corresponding hash values of the two or more second data records and a hash value of a (N−1)th data block, wherein the block height of the Nth data block monotonically increases as more blocks are generated;
   storing the Nth data block in a blockchain-type ledger;
   returning, by the database server, the corresponding hash values of the plurality of second data records to the application server;
   receiving, by the database server and from the application server, query requests that comprise the corresponding hash values of the plurality of second data records; and
   for each query request:
      obtaining, by the database server, a particular second data record by querying, the blockchain-type ledger in which each Nth data block is stored, based on the corresponding hash value of the query request, and returning the particular second data record to the application server.

7. The non-transitory, computer-readable medium of claim 6, wherein before determining, by the database server, the two or more second data records to be written in a data block, the operations comprise:
determining user public keys corresponding to the user identifiers of the first data records; and
verifying the plurality of second data records using the user public keys.

8. The non-transitory, computer-readable medium of claim 6, wherein the predetermined blockchain-type block generation condition comprises:
a quantity of second data records to be stored reaches a quantity threshold;
or a time interval from a last block generation time reaches a time threshold.

9. The non-transitory, computer-readable medium of claim 6, wherein the operations comprise:
forwarding, by the application server, the corresponding hash values of the second data records to first clients corresponding to the user identifiers of the first data records.

10. The non-transitory, computer-readable medium of claim 6, wherein the operations comprise, for each query request:
forwarding, by the application server, the particular second data record, obtained by the querying, to decryption and verification components of a second client from which the application server received the query request.

11. A computer-implemented system,
comprising: one or more computers comprising a database server;
and
one or more computer memory devices interoperably coupled with the one or more computers and having tangible, non-transitory, machine-readable media storing one or more instructions that, when executed by the one or more computers, perform one or more operations comprising:
receiving, by the database server and from an application server, a plurality of second data records, wherein each second data record comprises (i) a first data record comprising a user identifier and (ii) a user digital signature of the first data record generated by the application server in a trusted execution environment using a user private key corresponding to the user identifier of the first data record;
determining, for each second data record of the second data records, a corresponding hash value;
in response to a predetermined blockchain-type block generation condition being satisfied:
determining, by the database server, two or more second data records of the plurality of second data records to be written in a data block; and
generating an Nth data block comprising a hash value and a block height, wherein N is a sequence number of the Nth data block in a sequence of data blocks, and wherein when N=1, generating the Nth data block comprises
determining the hash value for the Nth data block based on (i) the hash values of the two or more second data records or (ii) a default hash value, and
assigning, as the block height of the Nth data block, an initial block height, and
when N>1, generating the Nth data block comprises determining the hash value for the Nth data block based on the corresponding hash values of the two or more second data records and a hash value of a (N−1)th data block, wherein the block height of the Nth data block monotonically increases as more blocks are generated;
storing the Nth data block in a blockchain-type ledger;
returning, by the database server, the corresponding hash values of the plurality of second data records to the application server;
receiving, by the database server and from the application server, query requests that comprise the corresponding hash values of the plurality of second data records; and
for each query request:
obtaining, by the database server, a particular second data record by querying, the blockchain-type ledger in which each Nth data block is stored, based on the corresponding hash value of the query request, and returning the particular second data record to the application server.

12. The computer-implemented system of claim 11, wherein before determining, by the database server, the two or more second data records to be written in a data block, the operations comprise:
determining user public keys corresponding to the user identifiers of the first data records; and
verifying the plurality of second data records using the user public keys.

13. The computer-implemented system of claim 11, wherein the predetermined blockchain-type block generation condition comprises:
a quantity of second data records to be stored reaches a quantity threshold;
or a time interval from a last block generation time reaches a time threshold.

14. The computer-implemented system of claim 11, wherein the operations comprise:
forwarding, by the application server, the corresponding hash values of the second data records to first clients corresponding to the user identifiers of the first data records.

15. The computer-implemented system of claim 11, wherein the operations comprise, for each query request:
forwarding, by the application server, the particular second data record, obtained by the querying, to decryption and verification components of a second client from which the application server received the query request.

* * * * *